United States Patent [19]

DiLorenzo

[11] Patent Number: 4,666,724

[45] Date of Patent: May 19, 1987

[54] COFFEE BREWING RING

[75] Inventor: Ralph N. DiLorenzo, Rolling Meadows, Ill.

[73] Assignee: Always, Inc., Rolling Meadows, Ill.

[21] Appl. No.: 776,957

[22] Filed: Sep. 17, 1985

[51] Int. Cl.⁴ .......................... A23F 5/00; A47J 31/10
[52] U.S. Cl. ......................................... 426/433; 99/295
[58] Field of Search ................. 99/279, 306, 295, 313, 99/304, 300, 305, 307, 316, 317; 426/433

[56] References Cited

U.S. PATENT DOCUMENTS

| | | | |
|---|---|---|---|
| 1,175,858 | 3/1916 | Wojidkow | 99/313 |
| 1,544,674 | 7/1925 | Miller . | |
| 1,778,792 | 10/1930 | Cameron | 99/313 |
| 1,877,971 | 9/1932 | Reid . | |
| 2,334,752 | 11/1943 | Clapp . | |
| 2,557,317 | 6/1951 | Serio | 99/313 |
| 2,626,560 | 1/1953 | Burkhardt | 99/319 |
| 2,684,624 | 7/1959 | Alvarez | 99/306 |
| 3,878,772 | 4/1975 | Nordskog | 99/295 |
| 3,931,756 | 1/1976 | Brunt | 99/306 |
| 4,168,656 | 9/1979 | Wolfer | 99/306 |

*Primary Examiner*—Robert W. Jenkins
*Attorney, Agent, or Firm*—Quarles & Brady

[57] ABSTRACT

A coffee brewing insert for improving the efficiency of a drip coffee maker, including a continuous annular wall defining first and second axially-spaced openings, the first opening having a larger diameter than the second. The insert is placed on the filter of a drip coffee maker and the coffee is placed inside. The orientation of the insert depends on the amount of coffee to be made, with the small opening down for small quantities of coffee and the large opening down for large quantities of coffee.

16 Claims, 6 Drawing Figures

COFFEE BREWING RING

BACKGROUND OF THE INVENTION

This invention relates to brewing coffee, and, in particular, to an insert for more efficient brewing of coffee in a drip coffee maker.

In the past, in drip coffee makers, coffee grounds were put into a large filter area lined by filter paper; hot water was poured into the filter area; the water contacted the grounds, putting the coffee flavor into solution in the water; and then the water passed through the filter paper into a vessel from which it was served.

These drip coffee makers were designed to make a relatively large quantity of coffee and were not well-suited to making one or two cups of coffee. Whether they were used for brewing a large or small quantity of coffee, the drip coffee makers used a large quantity of grounds to make any desired amount of coffee.

SUMMARY OF THE INVENTION

The present invention provides an insert or dam to be placed in the filter area of a drip coffee maker for more efficient brewing of coffee, regardless of the amount.

The coffee brewing insert has a continuous annular wall having first and second ends which define first and second axially-spaced openings. The first opening has a larger diameter than the second opening. Each end defines a flat outer surface such that each end can rest on a flat surface.

The present invention also defines a method for making coffee in a drip coffee maker, wherein the coffee brewing insert is centrally located in the filter area, coffee grounds are put inside the insert, and hot water is poured into one of the openings of the insert and drains down through the filter area.

The present invention provides a more efficient way of making coffee through the drip process, because it puts the hot water in greater contact with the coffee grounds. The coffee grounds remain immersed in hot water for a prolonged period of time, so each drop of water contacts more grounds than it would in a normal drip coffee maker. Also, the pouring water causes the confined grounds inside the brewing insert to tumble, and this tumbling action permits each drop of water to contact a greater surface area of coffee grounds than would be the case if the water passed straight through grounds resting on the floor of the filter area. Therefore, substantially fewer coffee grounds are needed in brewing coffee using the present invention, while obtaining the same strength and flavor of coffee.

The present invention also permits the person brewing coffee to adjust the effective surface area of the filter, depending on the amount of coffee to be brewed. In brewing a small amount of coffee, i.e. one or two cups, the small opening of the insert is placed down on the filter paper. In brewing larger amounts of coffee, up to twelve cups, the larger opening is placed down on the filter paper.

DESCRIPTION OF THE PREFERRED EMBODIMENTS

As shown in FIGS. 1-4, the first embodiment of the present invention is a coffee brewing insert 10. The insert 10 is made up of a continuous annular wall (continuous closed wall) 12 having first and second ends 14, 16, respectively. The first and second ends 14, 16 define first and second spaced openings 18, 20, which are aligned along the axis of the insert 10. The first of the axially-spaced openings 18 has a larger diameter than the second opening 20.

Figure 1:
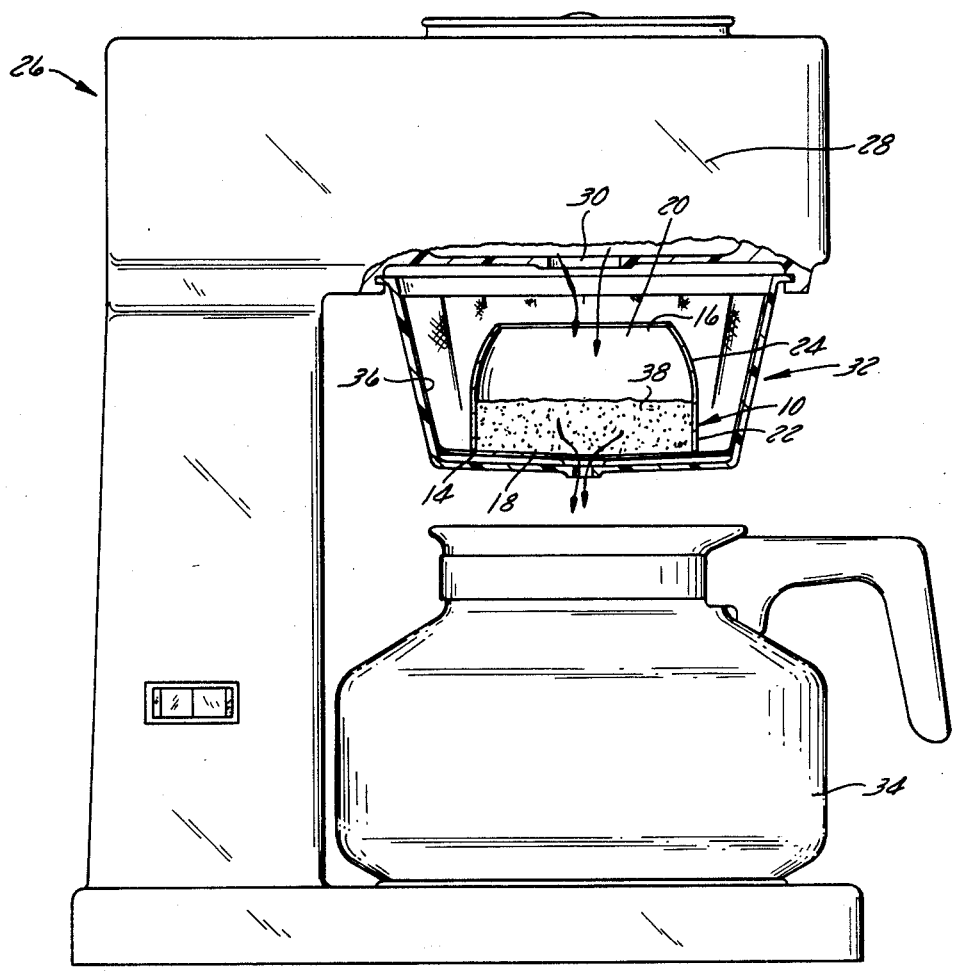
FIG. 1 is a view of a drip coffee maker, partially in section, showing a first embodiment of the insert of the present invention in position in the filter area of the coffee maker.
Figure 2:
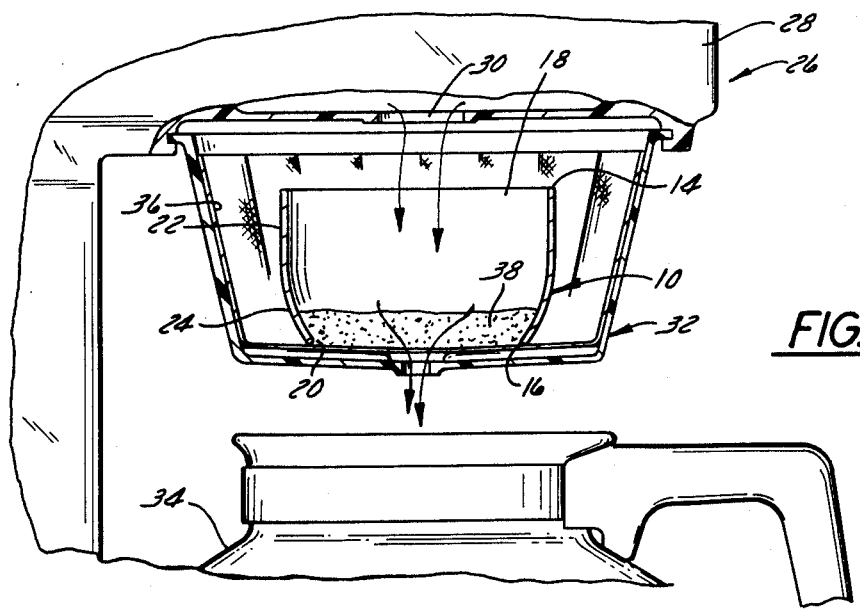
FIG. 2 is a view of a drip coffee maker, partially in section and partially broken away, and it shows the insert of FIG. 1 with the small end down.
Figure 3:
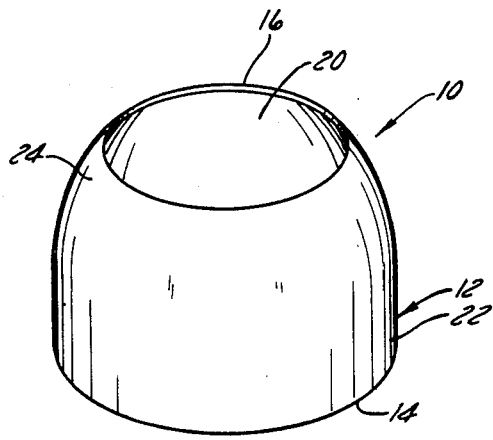
FIG. 3 is a perspective view of the embodiment of the insert shown in FIG. 1.

The shape of the inner and outer surfaces of the insert shown in FIGS. 1-4 is defined by a cylindrical portion 22 which has the diameter of, and which forms, the first opening 18. Blended into the cylindrical portion, and coaxial with it, is a tapering portion 24, which defines a portion of a sphere, and which extends to the second opening 20. The insert 10 has a flat outer surface at both ends 14, 16, so that either end can rest on a filter surface, as shown in FIGS. 1-2.

The height of the insert 10 measured along the axis from the first opening 18 to the second opening 20 is approximately one and three-quarters inches. The weight of the insert is aproximately three ounces, which is sufficient to prevent the insert froom lifting up or toppling when it is filled with water during the brewing process. The diameter of the first opening 18 is approximately three inches, and the diameter of the second opening 20 is approximately two and one-quarter inches. The height of the cylindrical portion 22 is approximately one and one-quarter inches, and the height of the tapering portion 24 is approximately one-half inch and has a radius of approximately one and one-half inches. This insert may be made of metal or plastic or other suitable material and may be formed or molded or made by other suitable methods known in the art.

The area of the filtering surface of most drip coffee makers is approximately eleven square inches. Therefore, when the insert is placed with the larger opening down, it covers approximately sixty-five percent of the filtering surface, and, with the smaller opening down, it covers approximately thirty-five percent of the filtering surface.

FIGS. 1-2 show the insert 10 as it is used in a drip coffee maker 26. The drip coffee maker 26 includes a portion 28 for heating the water, an opening or spout 30 for transferring the hot water to the cup-shaped filter portion 32, and a vessel 34 for catching the coffee once it is made. In order to make coffee, a disposable filter 36 is placed in the filter portion 32. The insert 10 is then placed on top of the disposable filter 36, with one of the ends 14, 16 resting on the filter 36. The insert 10 is centrally located so that the hot water will pass in through the top opening, either 18 or 20. Coffee grounds 38 are then placed inside the insert 10. If a small quantity of coffee (one or two cups) is to be made, the insert 10 is placed on the filter 36 with the small opening 20 down, as in FIG. 2; if a larger quantity of coffee is to be made, the insert 10 is placed on the filter 36 with the large opening 18 down, as in FIG. 1. Hot water is then passed from the water heating portion 28, through the spout 30, and into the insert 10. The water contacts the grounds and causes them to tumble, thereby efficiently extracting the coffee flavor from the grounds.

When the insert 10 has its first (large) opening 18 down on the filter paper, the tapered portion 24 of the insert 10 helps direct the grounds 38 so that they tend to tumble in a circular path. If there is a large quantity of water, the water and grounds may spill out the top opening 20 and be filtered by the filter paper outside of the insert 10. It is not necessary that the water and grounds be completely trapped by the insert 10 in order to obtain a greater efficiency in brewing the coffee.

An additional benefit of the insert 10 is that it tends to support the filter 36. Some inexpensive filter papers 36 tend to collapse during use and thus fail to filter out the coffee grounds. Because of the support provided by the insert 10, this problem is avoided.

Figure 5:
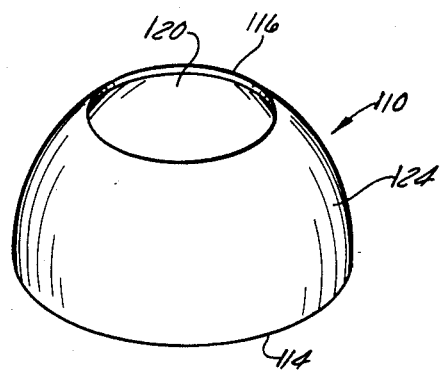
FIG. 5 is a perspective view of a second embodiment of the insert of the present invention.
Figure 4:
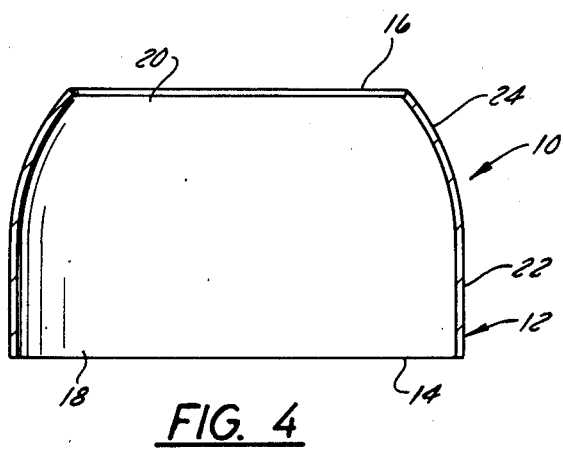
FIG. 4 is a sectional view of the insert shown in FIG. 3.
Figure 6:
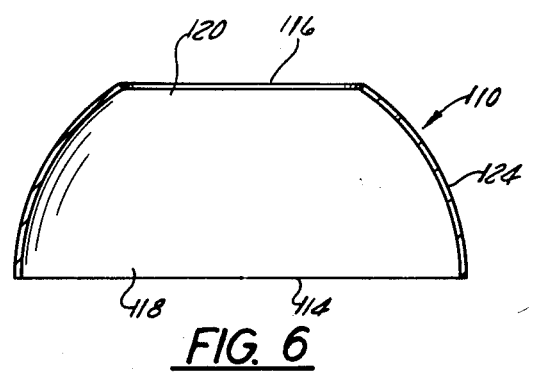
FIG. 6 is a sectional view of the insert shown in FIG. 5.

FIGS. 5-6 show an alternative insert 110 which is very similar to the first insert 10, except that the inner and outer surfaces of this embodiment are defined by a portion of a sphere. This embodiment also has a large first opening 118, a smaller, axially-spaced second opening 120, and is made of a continuous annular wall 112.

It will be obvious to those skilled in the art that various modifications may be made to the above-described embodiments without departing from the scope of the present invention.

What is claimed is:

1. A coffee brewing insert for use in a drip coffee maker, comprising:
   a continuous annular wall, adapted to fit inside the coffee filter area of a drip coffee maker, said wall having first and second ends which define first and second axially-spaced openings, said first opening having a larger diameter than said second opening with said annular wall tapering smoothly from said first opening to said second opening, and each of said first and second ends defining a flat outer surface, said insert having two operative positions in said coffee filter area depending on the amount of coffee to be brewed, so that, in the first operative position the first opening can rest on a flat filter surface for brewing large amounts of coffee, and, in the second operative position, the second opening can rest on a flat filter surface for brewing small amounts of coffee.

2. A coffee brewing insert as recited in claim 1, wherein the inner surface of said brewing insert defines a portion of a sphere.

3. A coffee brewing insert as recited in claim 2, wherein said insert is heavy enough to remain stable when it is filled with water.

4. A coffee brewing insert as recited in claim 3, wherein the diameter of said first opening is approximately three inches.

5. A coffee brewing insert as recited in claim 1, wherein the inner surface of said brewing insert defines a cylindrical portion, having the diameter of said first opening, and a tapering portion which tapers inward from said cylindrical portion, blending smoothly with said cylindrical portion, and extending to said second opening.

6. A coffee brewing insert as recited in claim 5, wherein said insert is heavy enough to remain stable when it is filled with water.

7. A coffee brewing insert as recited in claim 6, wherein the diameter of said first opening is approximately three inches.

8. A coffee brewing insert as recited in claim 1, wherein each of said first and second ends defines a continuous, flat outer surface.

9. A drip coffee maker, comprising:
   A. a water-heating portion;
   B. a filter portion, including:
      i. a filter, lining said filter portion; and
      ii. a coffee brewing insert resting on the central portion of said filter, comprising a continuous annular wall having first and second ends which define first and second axially-spaced openings, said first opening having a larger diameter than said second opening, with said annular wall tapering smoothly from said first opening to said second opening, each of said first and second ends defining a flat outer surface, said insert having two operative positions depending on the amount of coffee to be brewed with the larger of said ends resting on said filter for brewing large amounts of coffee and the smaller of said ends resting on said filter for brewing small amounts of coffee; and
   C. a vessel for receiving coffee as it passes through said filter.

10. A drip coffee maker as recited in claim 9, wherein the inner surface of said coffee brewing insert defines a portion of a sphere.

11. A drip coffee maker as recited in claim 10, wherein, when said first opening rests on said filter, it covers approximately sixty-five percent of the area of said filter, and, when said second opening rests on said filter, it covers approximately thirty-five percent of the area of said filter.

12. A drip coffee maker as recited in claim 9, wherein the inner surface of said coffee brewing insert defines a cylindrical portion, having the diameter of said first opening, and a tapering portion which tapers inward from said cylindrical portion, blending smoothly with said cylindrical portion and extending to said second opening.

13. A drip coffee maker as recited in claim 12, wherein, when said first opening rests on said filter, it covers approximately sixty-five perceant of the area of said filter, and, when said second opening rests on said filter, it covers approximately thirty-five percent of the area of said filter.

14. A drip coffee maker, comprising:
   A. a water-heating portion;
   B. a filter portion, including:
      i. a filter; and
      ii. a coffee brewing insert resting on the central portion of said filter, comprising a closed wall defining inner and outer surfaces and having first and second ends which respectively define first and second axially-spaced openings of different sizes, and each of said first and second ends defining a flat outer surface, said insert having two operative positions within said filter area depending upon the amount of coffee to be brewed so that, in the first operative position, the end having the smaller opening rests on the filter for brewing small amounts of coffee, and, in the second operative position, the end having the larger opening rests on the filter for brewing large amounts of coffee; and C. a vessel for receiving coffee as it passes through said filter.

15. A method for making coffee in a drip coffee maker, comprising the steps of:
   A. placing a disposable filter in the filtering portion of said drip coffee maker;
   B. deciding the amount of coffee that will be made;
   C. placing a coffee brewing insert in the central portion of said disposable filter, said coffee brewing insert comprising a continuous annular wall having first and second ends defining first and second axially-spaced openings, said first opening having a larger diameter than said second opening, with said annular wall tapering smoothly from said first opening to said second opening, and each of said first and second ends defining a flat outer surface, with one of said ends resting on said disposable filter;
   D. placing the insert with the appropriate opening down on the filter, depending upon the amount of coffee to be made;
   E. placing coffee grounds inside said coffee brewing insert; and
   F. pouring hot water into said filter portion such that it enters one of said openings of said coffee brewing insert, contacts the coffee grounds inside said insert, and passes out through said disposable filter.

16. A method for making coffee in a drip coffee maker having a filtering portion, comprising the steps of:
   A. placing a disposable filter on top of said filtering portion;
   B. deciding the amount of coffee that will be made;
   C. placing a coffee brewing insert in the central part of the filtering portion of said drip coffee maker, said coffee brewing insert comprising a closed wall defining inner and outer surfaces and having first and second ends which define first and second axially-spaced openings, respectively, one of said openings being larger than the other, and each of said first and second ends defining a flat outer surface, with one of said ends resting on said filtering portion, depending upon the amount of coffee to be made;
   D. placing coffee grounds inside said coffee brewing insert; and
   E. pouring hot water into said filter portion such that it enters one of said openings of said coffee brewing insert, contacts the coffee grounds inside said insert, and passes out through said filtering portion.

* * * * *